US010640244B2

(12) United States Patent
Widmer et al.

(10) Patent No.: US 10,640,244 B2
(45) **Date of Patent: *May 5, 2020**

(54) STRAPPING DEVICE HAVING A DISPLAY AND OPERATING APPARATUS

(71) Applicant: Signode Industrial Group LLC, Glenview, IL (US)

(72) Inventors: Roland Widmer, Haar (DE); Andreas Keller, Birr (CH)

(73) Assignee: Signode Industrial Group LLC, Glenview, IL (US)

( * ) Notice: Subject to any disclaimer, the term of this patent is extended or adjusted under 35 U.S.C. 154(b) by 962 days.

This patent is subject to a terminal disclaimer.

(21) Appl. No.: 14/888,014

(22) PCT Filed: May 5, 2014

(86) PCT No.: PCT/CH2014/000060
§ 371 (c)(1),
(2) Date: Dec. 29, 2015

(87) PCT Pub. No.: WO2014/186911
PCT Pub. Date: Nov. 27, 2014

(65) Prior Publication Data

US 2016/0159505 A1 Jun. 9, 2016

(30) Foreign Application Priority Data

May 5, 2013 (CH) ........................................ 910/13
May 5, 2013 (CH) ........................................ 911/13
(Continued)

(51) Int. Cl.
*B25F 5/02* (2006.01)
*B65B 13/02* (2006.01)
(Continued)

(52) U.S. Cl.
CPC .............. *B65B 13/025* (2013.01); *B25F 5/02* (2013.01); *B65B 13/18* (2013.01); *B65B 13/187* (2013.01);
(Continued)

(58) Field of Classification Search
CPC ..... B65B 13/025; B65B 13/18; B65B 13/187; B65B 13/22; B65B 13/32; B65B 13/327;
(Continued)

(56) References Cited

U.S. PATENT DOCUMENTS

| | | | |
|---|---|---|---|
| 3,367,374 | A | 2/1968 | Meier et al. |
| 3,654,033 | A | 4/1972 | Angarola et al. |

(Continued)

FOREIGN PATENT DOCUMENTS

| | | |
|---|---|---|
| CA | 2 432 353 | 12/2003 |
| CH | 705 745 | 5/2013 |

(Continued)

OTHER PUBLICATIONS

Receptacle definition—Google Search Jan. 8, 2019.*
(Continued)

*Primary Examiner* — Shelley M Self
*Assistant Examiner* — Katie L. Parr
(74) *Attorney, Agent, or Firm* — Neal, Gerber & Eisenberg LLP

(57) ABSTRACT

A mobile strapping device for wrapping material to be packed with a strap. The strapping device includes a modular assembly that includes a display and operating apparatus and at least part of a controller of the strapping device.

10 Claims, 9 Drawing Sheets

(30) Foreign Application Priority Data

Sep. 24, 2013 (CH) ........................................ 1629/13
Sep. 24, 2013 (CH) ........................................ 1630/13
Mar. 24, 2014 (CH) ........................................ 443/14

(51) Int. Cl.
*B65B 13/18* (2006.01)
*B65B 13/32* (2006.01)
*B65B 13/22* (2006.01)

(52) U.S. Cl.
CPC .............. *B65B 13/22* (2013.01); *B65B 13/32* (2013.01); *B65B 13/327* (2013.01); *B65B 13/322* (2013.01)

(58) Field of Classification Search
CPC .. B65B 13/322; G05B 19/042; H05K 5/0017; H05K 5/0065; B25F 5/02
USPC ...................................................... 100/29, 32
See application file for complete search history.

(56) References Cited

U.S. PATENT DOCUMENTS

| | | | |
|---|---|---|---|
| 4,011,807 | A | 3/1977 | Kobiella |
| 4,015,643 | A | 4/1977 | Cheung |
| 4,050,372 | A | 9/1977 | Kobiella |
| 4,240,865 | A | 12/1980 | Kyts |
| 4,313,779 | A | 2/1982 | Nix |
| 4,450,032 | A | 5/1984 | Wehr |
| 4,535,730 | A | 8/1985 | Allen |
| 4,572,064 | A | 2/1986 | Burton et al. |
| 4,707,390 | A | 11/1987 | Cheung |
| 4,776,905 | A | 10/1988 | Cheung et al. |
| 5,133,532 | A | 7/1992 | Figiel et al. |
| 5,146,847 | A | 9/1992 | Lyon et al. |
| 5,155,982 | A | 10/1992 | Boek et al. |
| 5,159,218 | A | 10/1992 | Murry et al. |
| 5,379,576 | A | 1/1995 | Koyama et al. |
| 5,516,022 | A | 5/1996 | Annis, Jr. |
| 5,689,943 | A | 11/1997 | Wehr |
| 5,690,023 | A | 11/1997 | Stamm et al. |
| 5,798,596 | A | 8/1998 | Lordo |
| 5,809,873 | A | 9/1998 | Chak et al. |
| 6,003,578 | A | 12/1999 | Chang |
| 6,109,325 | A | 8/2000 | Chang |
| 6,308,760 | B1 | 10/2001 | Finzo et al. |
| 6,332,306 | B1 | 12/2001 | Finzo et al. |
| 6,405,766 | B1 | 6/2002 | Benjey |
| 6,516,715 | B1 | 2/2003 | Reiche |
| 6,578,337 | B2 | 6/2003 | Scholl et al. |
| 6,606,766 | B2 | 8/2003 | Ko |
| 6,644,713 | B2 | 11/2003 | Del Pozo Abejon et al. |
| 6,715,375 | B2 | 4/2004 | Nestler |
| 6,729,357 | B2 | 5/2004 | Marsche |
| 6,732,638 | B1 | 5/2004 | Rometty et al. |
| 6,817,159 | B2 | 11/2004 | Sakaki et al. |
| 6,918,235 | B2 | 7/2005 | Nix |
| 7,011,000 | B2 | 3/2006 | Kushida et al. |
| 7,073,431 | B1 | 7/2006 | Chen |
| 7,249,862 | B2 | 7/2007 | Shirane |
| 7,312,609 | B2 | 12/2007 | Schmollngruber et al. |
| 7,456,608 | B2 | 11/2008 | Kageler et al. |
| 8,198,839 | B2 | 6/2012 | Katou et al. |
| 8,378,600 | B2 | 2/2013 | Katou et al. |
| 9,174,752 | B2 | 11/2015 | Neeser et al. |
| 9,193,486 | B2 | 11/2015 | Neeser et al. |
| 9,254,932 | B2 | 2/2016 | Neeser et al. |
| 9,284,080 | B2 | 3/2016 | Neeser et al. |
| 9,315,283 | B2 | 4/2016 | Neeser et al. |
| 9,403,609 | B2 * | 8/2016 | Bonifazi ............... B65B 13/025 |
| 2002/0100146 | A1 | 8/2002 | Ko |
| 2002/0129717 | A1 | 9/2002 | Helland et al. |
| 2002/0134811 | A1 | 9/2002 | Napier et al. |
| 2003/0145900 | A1 | 8/2003 | Jensen et al. |
| 2004/0206251 | A1 | 10/2004 | Nix |
| 2005/0279198 | A1 | 12/2005 | Kushida et al. |
| 2006/0108180 | A1 | 5/2006 | Grach et al. |
| 2006/0192527 | A1 | 8/2006 | Kageler et al. |
| 2009/0013656 | A1 | 1/2009 | Nasiatka et al. |
| 2009/0114308 | A1 | 5/2009 | Marelin et al. |
| 2011/0056392 | A1 * | 3/2011 | Neeser .................. B65B 13/025 100/29 |
| 2011/0100233 | A1 | 5/2011 | Neeser et al. |
| 2011/0253480 | A1 * | 10/2011 | Goodman ........... G01M 13/028 184/36 |
| 2012/0017780 | A1 | 1/2012 | Haberstroh et al. |
| 2012/0160364 | A1 | 6/2012 | Katou et al. |
| 2012/0210682 | A1 | 8/2012 | Gardner |
| 2014/0008090 | A1 * | 1/2014 | Kokinelis ................. B25F 5/02 173/170 |

FOREIGN PATENT DOCUMENTS

| | | | |
|---|---|---|---|
| CN | 1151129 | 6/1997 | |
| CN | 2266566 | 11/1997 | |
| CN | 1203878 | 1/1999 | |
| CN | 1253099 | 5/2000 | |
| CN | 1418163 | 5/2003 | |
| CN | 1558842 | 12/2004 | |
| CN | 1660675 | 8/2005 | |
| CN | 1859999 | 11/2006 | |
| CN | 101134308 | 3/2008 | |
| CN | 101164416 | 4/2008 | |
| CN | 101287578 | 10/2008 | |
| CN | 101486329 | 7/2009 | |
| CN | 101585244 A | 11/2009 | |
| CN | 201411061 | 2/2010 | |
| CN | 101678903 | 3/2010 | |
| CN | 101870367 | 10/2010 | |
| CN | 102026873 | 4/2011 | |
| CN | 102026874 | 4/2011 | |
| CN | 102026875 | 4/2011 | |
| CN | 202100012 | 1/2012 | |
| DE | 39 16 355 | 12/1989 | |
| DE | 40 14 305 | 11/1991 | |
| DE | 4204420 A1 * | 8/1993 | ............. B23B 45/02 |
| DE | 19751861 | 1/1999 | |
| DE | 10026200 | 11/2001 | |
| DE | 20321137 | 1/2006 | |
| DE | 10 2005 049130 | 4/2007 | |
| DE | 10 2006 007990 | 8/2007 | |
| DE | 10 2009 047443 | 6/2011 | |
| DE | 202011050797 | 11/2011 | |
| EP | 0095643 | 12/1983 | |
| EP | 0480627 | 4/1992 | |
| EP | 0603868 | 6/1994 | |
| EP | 0 659 525 | 6/1995 | |
| EP | 0744343 | 11/1996 | |
| EP | 0949146 | 10/1999 | |
| EP | 0997377 | 5/2000 | |
| EP | 0999133 | 5/2000 | |
| EP | 1177978 | 2/2002 | |
| EP | 1316506 | 6/2003 | |
| EP | 1413519 | 4/2004 | |
| EP | 2271553 | 4/2013 | |
| GB | 1 161 827 | 8/1969 | |
| GB | 2 041 869 | 9/1980 | |
| GB | 2 481 724 | 1/2012 | |
| JP | S5290398 | 7/1977 | |
| JP | S541238 | 1/1979 | |
| JP | S5638220 | 4/1981 | |
| JP | S6322320 | 1/1988 | |
| JP | H05198241 | 8/1993 | |
| JP | H07300108 | 11/1995 | |
| JP | H08258808 | 10/1996 | |
| JP | H08324506 | 12/1996 | |
| JP | H09283103 | 10/1997 | |
| JP | 3044132 | 5/2000 | |
| JP | 2000128113 | 5/2000 | |
| JP | 2000128115 | 5/2000 | |
| JP | 3227693 | 11/2001 | |
| JP | 3242081 | 12/2001 | |
| JP | 2002235830 | 8/2002 | |

(56) References Cited

FOREIGN PATENT DOCUMENTS

| | | |
|---|---|---|
| JP | 2003170906 | 6/2003 |
| JP | 2003231291 | 8/2003 |
| JP | 2003348899 | 12/2003 |
| JP | 2004108593 | 4/2004 |
| JP | 3548622 | 7/2004 |
| JP | 2004241150 | 8/2004 |
| JP | 2004323111 | 11/2004 |
| JP | 2007276042 | 10/2007 |
| JP | 4406016 | 1/2010 |
| KR | 840002211 | 12/1984 |
| KR | 20000029337 | 5/2000 |
| RU | 1772784 | 10/1992 |
| RU | 2118277 | 8/1998 |
| RU | 2161773 | 1/2001 |
| RU | 2004115639 | 1/2006 |
| RU | 2355821 | 5/2009 |
| SU | 1134117 | 1/1985 |
| WO | WO 01/89929 | 11/2001 |
| WO | WO 2006/048738 | 5/2006 |
| WO | WO 2007/116914 | 10/2007 |
| WO | WO 2009/129633 | 10/2009 |
| WO | WO 2009/129636 | 10/2009 |

OTHER PUBLICATIONS

Brushless DC Motor Drives, by Ali Emandi, in Energy-Efficient Electrical Motors, 3rd ed., Aug. 2004, ¶. 270-272, CRC Press & Marcel Dekker.

Lithium ion technology: shaping power tool. By Bender, in Air conditioning, heating, and refrigeration news. vol. 228, Issue 14, p. 18 Jul. 31, 2006.

International Search Report for International Application No. PCT/CH2014/000060 dated Aug. 11, 2014 (6 pages).

Taiwan Intellectual Property Office, Official Letter and Search Report dated May 10, 2018 from corresponding co-pending Taiwan Patent Application No. 103116015 (5 pages total).

* cited by examiner 1
2
3
4
5
15
16
20
25
25a
31
32
36
37
37a
38
40
41
42
10
10a

STRAPPING DEVICE HAVING A DISPLAY AND OPERATING APPARATUS

This application is a national stage entry of PCT/CH2014/000060, filed on May 5, 2014, which claims priority to and the benefit of Switzerland Patent Application Nos.: (1) 443/14, filed on Mar. 24, 2014; (2) 1630/13, filed on Sep. 24, 2013; (3) 1629/13, filed on Sep. 24, 2014; (4) 911/13, filed on May 5, 2013; and (5) 910/13, filed on May 5, 2013, the entire contents of each of which are incorporated herein by reference.

The invention relates to a mobile strapping apparatus for strapping articles for packing with a strapping band, which strapping apparatus has a tensioning device for applying a band tension to a loop of a strapping band, and a connecting device, in particular a friction welding or vibration welding connecting device, for producing a connection on the strapping band at two regions, situated one above the other, of the loop of the strapping band, which connecting device is equipped with means for supplying energy, wherein the energy provided by said means, in particular electrical energy, is provided as drive energy for motor-imparted drive movements of the strapping apparatus, and has a housing which in particular has with a front housing region formed as a cover for the tensioning device, and with a rear housing region, which is preferably provided for accommodating the energy store, and with a handle for holding the strapping apparatus, which handle is arranged between the front housing region and the rear housing region.

Strapping apparatuses of said type, which are already known, have a tensioning device by means of which an adequately high band tension can be applied to a band loop that has been placed around the respective article for packing. By means, preferably, of a clamping device of the strapping apparatus, it is then possible for the band loop to be fixed to the article for packing for the subsequent connecting process. In the case of generic strapping apparatuses, the connecting process is performed by way of a vibration welding device, in particular by way of a friction welding device. Here, pressure is exerted on the band by means of a friction shoe which moves in oscillating fashion in the region of two ends of the band loop. The pressure and the heat generated by the oscillating movement of sections of the two band sections causes the band, which generally has plastic, to locally melt for a short period of time. This gives rise to a permanent connection, which can be released again at most with high force, between the two band layers.

Generic strapping apparatuses are provided for mobile use, wherein the appliances are intended to be carried by a user to the respective usage location and should generally not be dependent there on the use of externally supplied energy. In embodiments that fall within the invention, it may however also be possible for the mobile and portable strapping apparatus to be supplied with externally supplied energy. In the case of known strapping appliances, the energy required for the intended use of such strapping appliances for tensioning a strapping band around articles for packing of any type and for producing a fastening is generally provided by an electric battery or by compressed air. By means of said energy, the band tension introduced into the band by means of the tensioning device is generated, and a fastening is produced on the strapping band. Generic strapping apparatuses, and thus also strapping apparatuses according to the invention, are furthermore provided for connecting only weldable plastics bands to one another.

In the case of generic strapping appliances, it is generally possible for settings for the strapping process to be performed, such as for example the magnitude of the tensioning force to be applied to the strapping band, the duration of the welding time, or different operating modes of the strapping appliance. For this purpose, on the strapping appliance, there are provided elements such as, for example, pushbuttons, by means of which such settings can be performed and changed. Likewise, provision is commonly made for information regarding the operating state and/or regarding settings that have been performed to be visually indicated by way of corresponding display means on the strapping appliance. The display means and the setting elements are normally arranged, in the form of mechanical pushbuttons and levers and LEDs, in distributed fashion in the region of the front housing part. Furthermore, for the drive device, control electronics and possibly power electronics are provided, which are normally arranged in the region of the drive device and connected by cabling to the controller and to the energy supply.

The invention is therefore based on the object of providing a generic strapping apparatus of the type mentioned in the introduction, which is more expediently constructed with regard to assembly and repair characteristics.

Said object is achieved according to the invention, in the case of a strapping apparatus of the type mentioned in the introduction, by way of an assembly comprising the display and operating device and at least parts of the controller of the strapping apparatus. It is preferably possible for the entire controller to belong to said structural unit. According to the invention, it is thus provided that the display and operating device, by means of which visual information regarding the strapping apparatus is communicated to the operator and by means of which settings can be performed on the strapping apparatus, is arranged in the immediate vicinity of the control electronics. In this way, the cabling between said two components can be kept short or omitted entirely and, for example, be replaced in an advantageous manner by way of one or more electrical contact elements by which the display and operating device is electrically connected to the control electronics and via which signals can be transmitted. The structural unit or assembly may also preferably be equipped with the complete electronics of the strapping apparatus. Since such a structural unit or assembly can be preassembled, the installation of the display and operating device and of the controller into the strapping apparatus can be performed particularly easily and quickly. A further significant advantage arises from the fact that, in the event of a defect, the defective structural unit can be exchanged for a new structural unit quickly and with little effort.

In a preferred embodiment of the invention, the strapping apparatus is equipped with at least one—preferably with only one—electric motor, wherein the assembly may also have the power electronics for the at least one electric motor.

In a preferred embodiment of the invention, it is possible for at least a part of the control electronics of the strapping apparatus, such as for example a printed circuit board, to be arranged below the display and operating device. In a further expedient embodiment of the invention, it is also possible for the power electronics for the motor to be arranged entirely or at least partially in a region below the display and operating device. Here, it is particularly preferable for the control and power electronics to be situated on a common support, in particular on a common printed circuit board.

In a further preferred embodiment of the invention, the assembly may be arranged in a rear housing region of the strapping apparatus. Here, "a "front" housing region may be understood to mean that housing region which is situated in front of the operating hand of a user. When the operator grips the handle, out of the fingers of the operating hand, the thumb and the index finger are situated closest to the front housing region. By contrast, the "rear housing region" is situated behind the operating hand. Of the operating hand gripping the handle of the strapping apparatus, the little finger of the operating hand is situated closest to the rear housing region. In the case of this arrangement, the assembly, which is preferably arranged in the rear housing region, has the further advantage that, even during routine maintenance procedures, the mechanism of the strapping apparatus, which is preferably arranged in the front housing region, does not pose an obstruction and, here, also cannot be inadvertently damaged. By contrast to the conventional arrangement of the previous display device and operating device, it is also possible, through the arrangement of the assembly, which is now provided, in the rear housing region of the strapping apparatus, to realize a relocation of weight from the front housing region into the rear housing region. Since it is normally the case that the front housing region tends to be top-heavy owing to a higher weight, said top-heaviness can be at least reduced.

The assembly, which preferably also has a display of the display and operating device, may advantageously in particular be arranged on the housing such that the display is arranged on a top side of the housing. The operator is thereby able to read information regarding the strapping apparatus from the display while using the strapping apparatus. Here, the display may be arranged in particular in the rear housing region.

Particular advantages can be attained with preferred embodiments according to the invention in which at least one display means is arranged on the rear housing region. The display means is thus expediently situated—in relation to a longitudinal extent of the strapping apparatus—behind the handle. Owing to the oblique position of at least one section of the profile of the handle, the display means is situated in the field of view of the user even during the use of the mobile strapping apparatus, and is not concealed by the arm of the user. The user can thus read information from the display means even during strapping processes, whereby a further improvement in the ergonomics of the strapping apparatus can be achieved.

In a preferred further embodiment according to the invention, the display means may comprise a touchscreen. The touchscreen may extend over a certain area and display different items of information on said area. Said touchscreen may even display different items of information alternately on the same area regions, for example in selectable different display levels. With the touchscreen, it may furthermore be provided that said touchscreen displays actuatable operating elements that can be selected by touching the touchscreen. Said operating elements may also be capable of being arranged and selected in different logical operating levels. For this purpose, the touchscreen may be equipped with a GUI (Graphical User Interface). In the context of the invention, a touchscreen may therefore be understood to mean an input and display device, in the case of which, by touching a predeterminable area region of said device, inputs can be made which either generate inputs for the control of the strapping apparatus and/or trigger functions of the strapping apparatus. The inputs may be made in particular by way of a touch action using a finger. In other embodiments of the invention, it is also possible, in addition to a touchscreen, for further operating elements to be provided, by means of which inputs can be performed and/or settings on the strapping apparatus can be performed.

The assembly may advantageously be inserted into a recess of the housing. A cover for closing off the inserted assembly may in this case accommodate the display. The cover should therefore be a constituent part of the display and operating device, which may be a subassembly of the assembly according to the invention. The assembly should advantageously be detachably fastenable to the housing and, for repair or maintenance purposes, should be able to be entirely or partially removed from the housing again and exchanged if necessary.

Further preferred refinements of the invention will emerge from the claims, from the description and from the drawings.

The invention will be discussed in more detail on the basis of exemplary embodiments which are illustrated purely schematically in the figures, in which:

FIG. 7 shows a second exemplary embodiment of the apparatus, shown partially in an exploded illustration, from the illustrations of FIGS. 10 and 11.

Figures 1, 2:
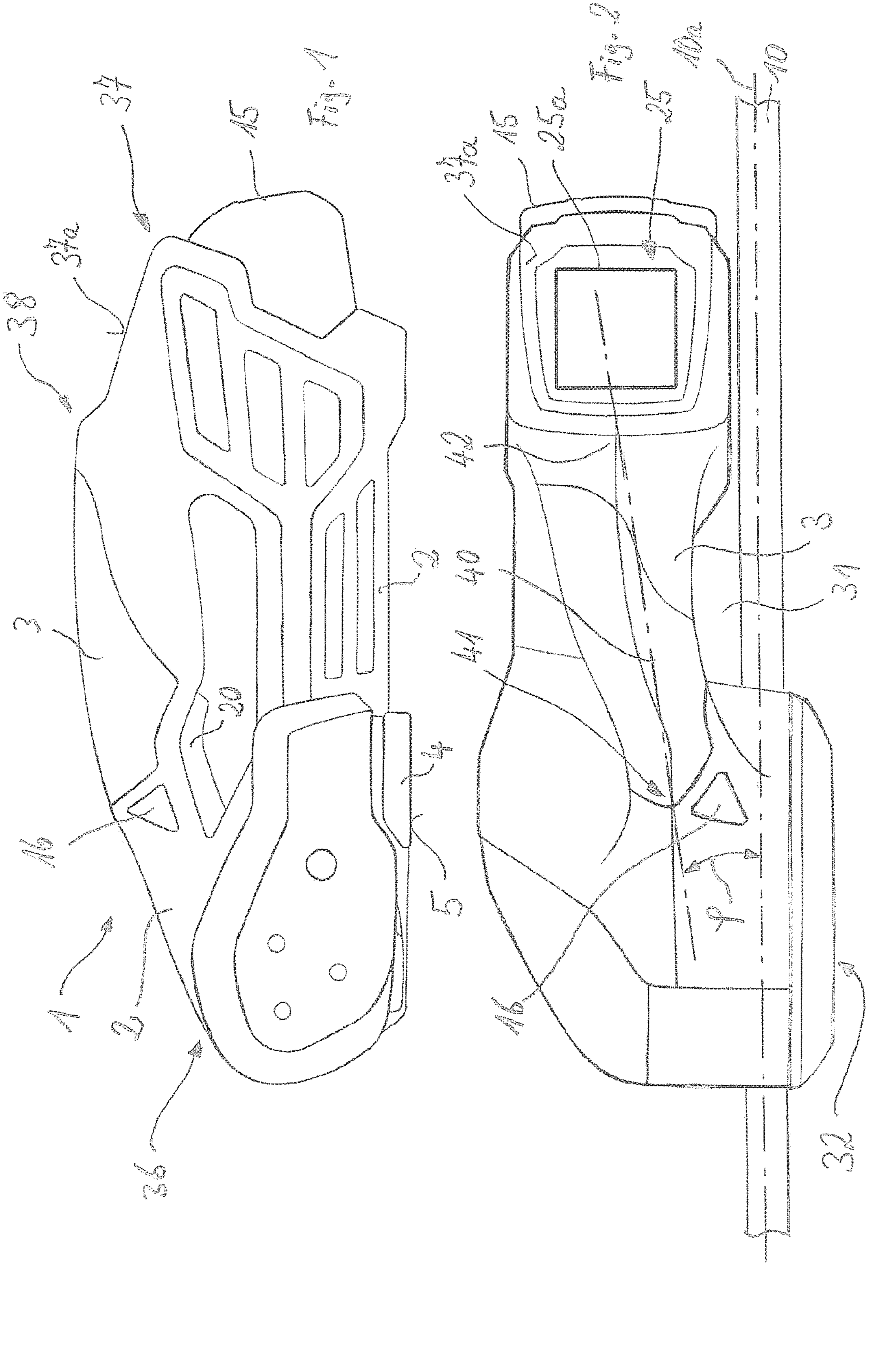
FIG. 1 shows a side view of one embodiment of a mobile strapping apparatus.
FIG. 2 shows a plan view of the strapping apparatus from FIG. 1 with a strapping band placed therein.
Figure 3:
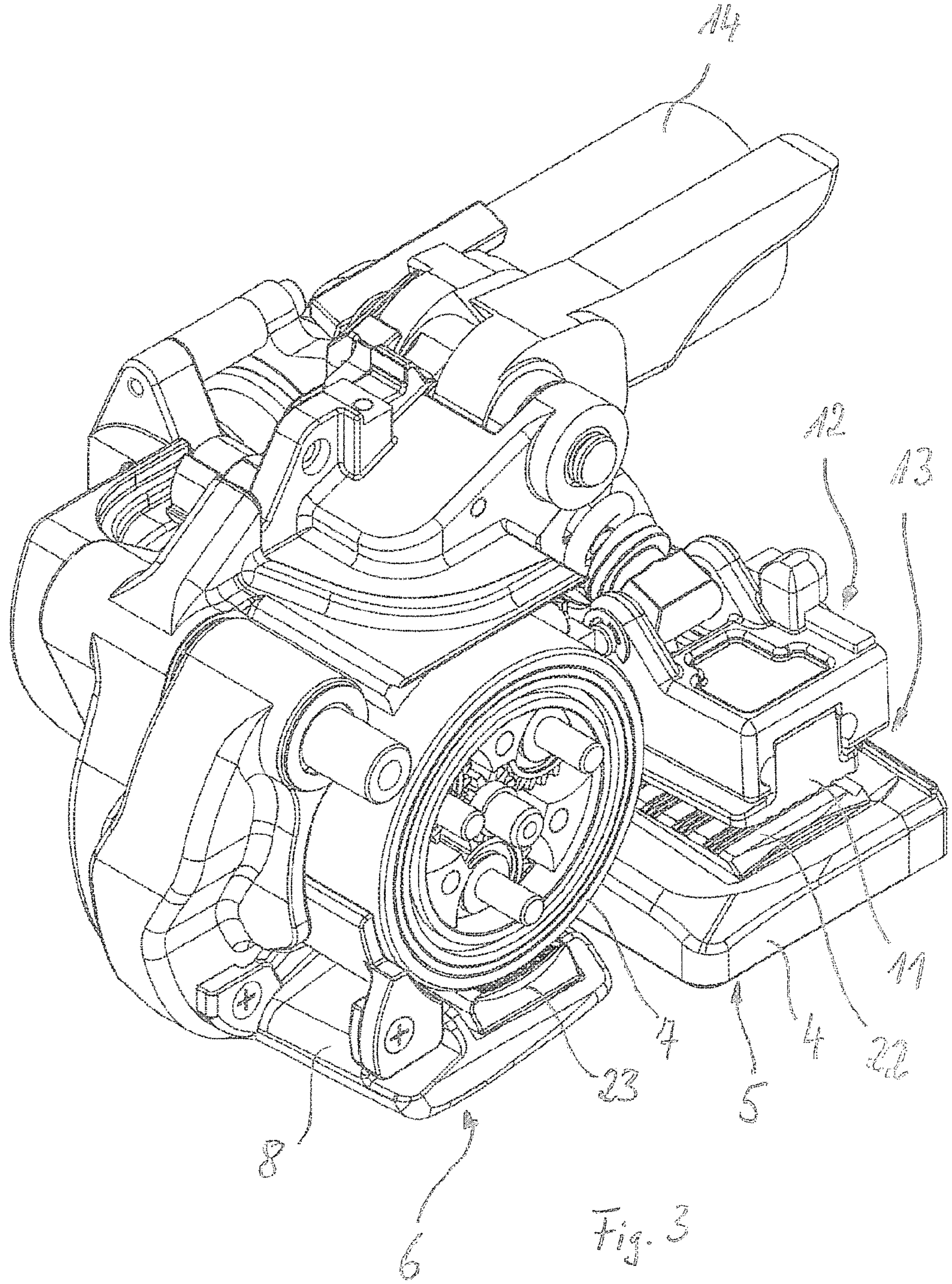
FIG. 3 shows the strapping apparatus with a housing having been removed.

One embodiment of the manually actuatable mobile strapping appliance 1 (strapping apparatus) shown in FIGS. 1, 2, and 3 has a housing 2 which surrounds the mechanism of the strapping appliance and on which there is formed a handle 3 for the handling of the appliance. The strapping appliance is furthermore equipped with a base plate 4, on the underside of which there is provided a base surface 5 for arrangement on an article to be packaged. All of the functional units of the strapping appliance 1 are fastened on the base plate 4 and on the carrier (not illustrated in any more detail) of the strapping appliance, said carrier being connected to the base plate.

By means of the strapping appliance 1, a loop (not illustrated in any more detail in FIG. 1) of a plastic band 10, composed for example of polypropylene (PP) or polyester (PET), which loop has, beforehand, been placed around the article to be packaged, can be tensioned by means of a tensioning device 6 of the strapping apparatus. For this purpose, the tensioning device 6, which is provided as a constituent part of the strapping appliance, has a tensioning wheel 7 as a tensioning tool by means of which the band 10 can be gripped for a tensioning process. Here, in the illustrated exemplary embodiment, the tensioning wheel 7 interacts with a rocker 8 which can, by means of a rocker pushbutton 9, be pivoted about a rocker pivot axis 8*a* from an end position with a spacing to the tensioning wheel into a second end position in which the rocker 8 bears against the tensioning wheel 7. Here, the band 10 situated between the tensioning wheel 7 and the rocker 8 also lies against the tensioning wheel 7. By rotation of the tensioning wheel 7, it is then possible for the band to be pressed against the tensioning wheel 7 and, by rotation of the tensioning wheel 7, for a pulling-back movement of the band to be generated, by means of which the band loop can have imparted to it a high band tension which is adequate for the purposes of the packaging operation.

Subsequently, at a point of the band loop at which two layers of the band 10 lie one above the other, welding of the two layers can be performed by means of the fastening device, which is formed as a friction welding device 13 of the strapping appliance. The band loop can hereby be permanently closed. For this purpose, the friction welding device 13 is equipped with a welding shoe 11 which, by way of mechanical pressure on the strapping band and a simultaneous oscillating movement with a predetermined frequency, causes the two layers of the strapping band 10 to melt. The plasticized or molten regions of the two band layers flow into one another and, after the band 10 cools, a connection between the two band layers then forms during a cooling period. If necessary, the band loop may then simultaneously be severed from a supply roll (not illustrated) of the band 10 by means of a severing device 12 of the strapping appliance 1. Subsequently, the strapping appliance 1 can be removed from the article for packing and from the band strap produced.

The actuation of the tensioning device 6, the advancement of the friction welding device 13 by means of a transfer device of the friction welding device 13, and also the use of the friction welding device per se, and the actuation of the cutting device, are performed using only one common electric motor 14, which provides a respective drive movement for these components. The structural solution provided for this purpose may correspond to that described in WO2009/129634 A1, the content of disclosure of which is hereby incorporated by reference. For the supply of electricity, an exchangeable battery 15, which can in particular be removed in order to be charged, is arranged on the strapping appliance. A supply of other external auxiliary energy, such as for example compressed air or further electricity, is duly not provided in the case of the preferred strapping appliance as per FIGS. 1 to 3, though may be provided in other embodiments of the invention.

In the present case, the portable, mobile strapping appliance 1 has an actuation element 16, configured as a press switch, which is provided for setting the motor in operation and which will hereinafter be referred to as tensioning pushbutton. For the actuation element 16, it is possible to set three modes by means of a mode switch 17 (FIG. 4) which, in this exemplary embodiment according to the invention, is contained in the operating and display panel 25. In the first mode, through subsequent actuation of the actuation element 16, both the tensioning device 6 and the friction welding device 13 are triggered in succession and in automated fashion, without further activities on the part of an operator being necessary. To set the second mode, the switch 17 is switched into a second switching mode. The switching state of the switch 17 is, with its settable modes and likewise the switching state of the actuation element 16, presented and displayed on the display panel. Then, in the second possible mode, actuation of the tensioning pushbutton 16 causes only the tensioning device 6 to be triggered. For the separate triggering of the friction welding device 13, it is necessary for the tensioning pushbutton 16 to be actuated by the operator for a second time. The third mode is a type of semi-automatic mode, in which the actuation element provided as tensioning pushbutton 16 must be depressed until the tensioning force or tensile stress in the band, which can be preset in stages, is attained. In this mode, it is possible to interrupt the tensioning process by releasing the tensioning pushbutton 16, for example in order for corner protectors to be fitted, under the strapping band, onto the article for strapping. The tensioning process can then be resumed by pressing the tensioning pushbutton 16. Said third mode may be combined both with a separately triggered friction welding process and with an automatically following friction welding process. The electrical supply is ensured by the battery 15, which is in the form of a lithium-ion battery.

During the formation of a fastening, after the band has been placed, in the form of a loop, around the article for packing, is guided here in a predetermined manner in one layer through the tensioning device 6 and in two layers through the fastening device. In other embodiments of the invention, it may also be provided that the strapping band is arranged in two layers between the tensioning wheel and the tensioning plate—or some other counter support which interacts with the tensioning wheel—for the tensioning process. The intended band tension is imparted by engagement of the tensioning device 6 into the upper layer, guided through the tensioning device 6, of the band and by way of a pulling-back movement of the band. Thereafter, the welding shoe 11 is lowered in the direction of a counter support surface 22 of the base plate 4. Depending on the activated operating mode of the strapping appliance 1, this takes place automatically following the completion of the tensioning process or as a result of separate triggering of the friction welding process by actuation of the pushbutton provided for the purpose. During the friction welding process, the band remains clamped between the tensioning wheel 7 and the tensioning counter support 23, and is held there during the formation of a fastening. During this method step of forming the strapping, the tensioning device has the function of a band clamp or of a clamping device which, by way of two interacting clamping elements, clamps the band between them. As a result of the lowering of the welding shoe 11, the two band layers that have been guided through the fastening device are pressed against one another and against the counter support surface 22.

In the fastening device, the band is arranged in two layers, wherein the lower band layer lies with its lower band surface against the inclined counter support surface 22 and is pressed against the latter. With the upper surface, the lower band layer lies against the lower surface of the upper band layer. The welding shoe 11 presses against the upper surface of the upper band layer. In said position of the band, the friction welding device 13 commences the formation of a fastening by way of the oscillating movement of the welding shoe 11 transversely with respect to the longitudinal profile of the band. In this way, the two band layers bearing against one another are melted. The materials of the band layers flow into one another and form a cohesive connection during the subsequent cooling process when the oscillating movement of the welding shoe has been stopped. Subsequently, the welding shoe 11 is moved away from the counter support surface 22 and the tensioning device 6 is removed from the band, whereby the clamping action is eliminated, and the two band layers are released.

The strapping appliance according to the invention is equipped with the operating and display panel 25, which may also be in the form of a touchscreen. The touchscreen may be a resistive or capacitive touch-sensitive areal screen (display), wherein other forms of touchscreen could also be used. In the exemplary embodiment, the touchscreen has a substantially rectangular display and operating surface 25*a*. Such touchscreens are marketed for example by the company Ad Metro, 1181 Parisien Street, Ottawa, Ontario, Canada K1B 4W4, which can be sourced in Germany from the company Interelectronix e.K., Ottostrasse 1, 85649 Hofolding.

In other embodiments, the display and operating device may also have conventional switch pushbuttons or other operating elements, in particular foil pushbuttons and other pushbuttons in the case of which the position of the pushbutton is fixedly and invariantly predefined, and a mechanical change in the switching state of said switching pushbutton is effected not just by touch but (also) by pressure. In such alternative embodiments, information regarding the state of the strapping apparatus may likewise be performed by way of conventional display devices without operating elements integrated into the display area, such as for example by way of LCD or TFT displays.

Figure 4:
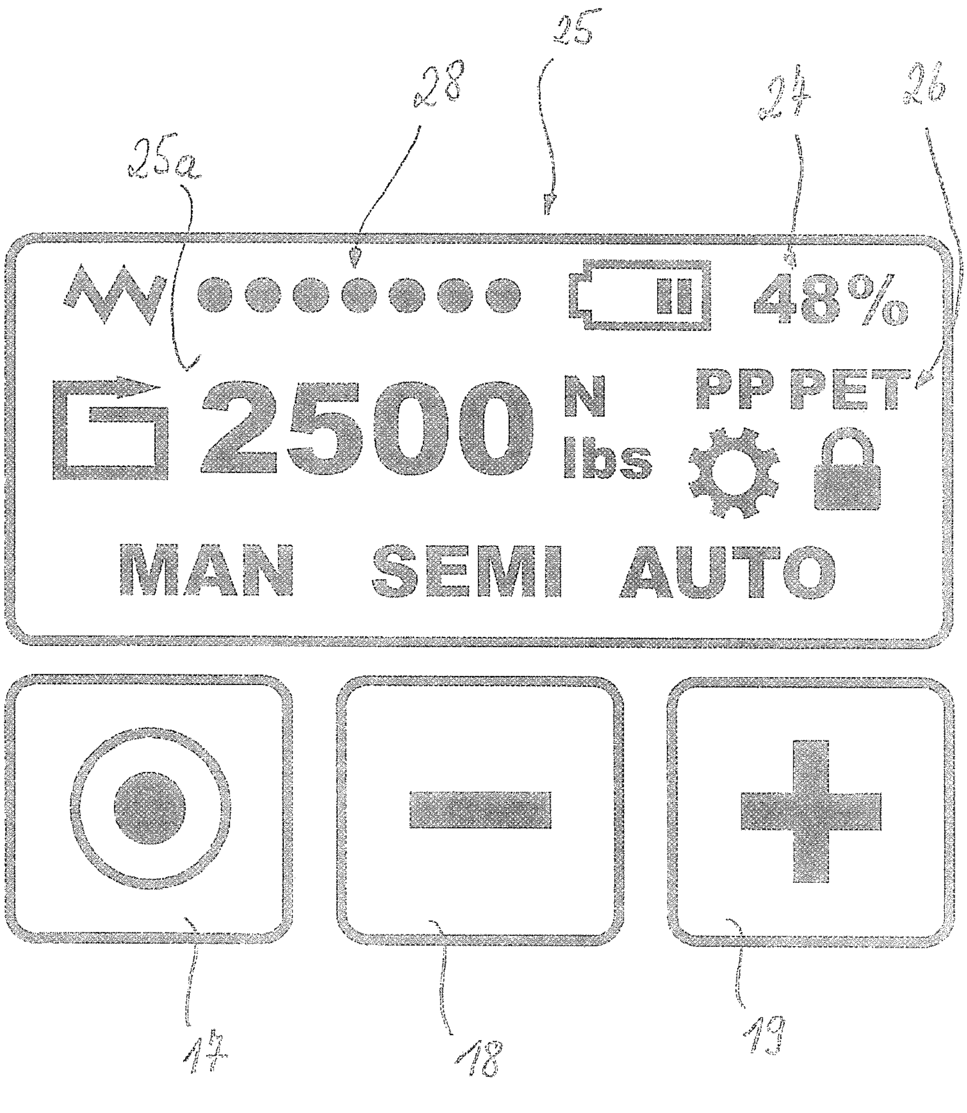
FIG. 4 shows the operating and display panel of the strapping apparatus from FIGS. 1 and 2.
Figure 5:
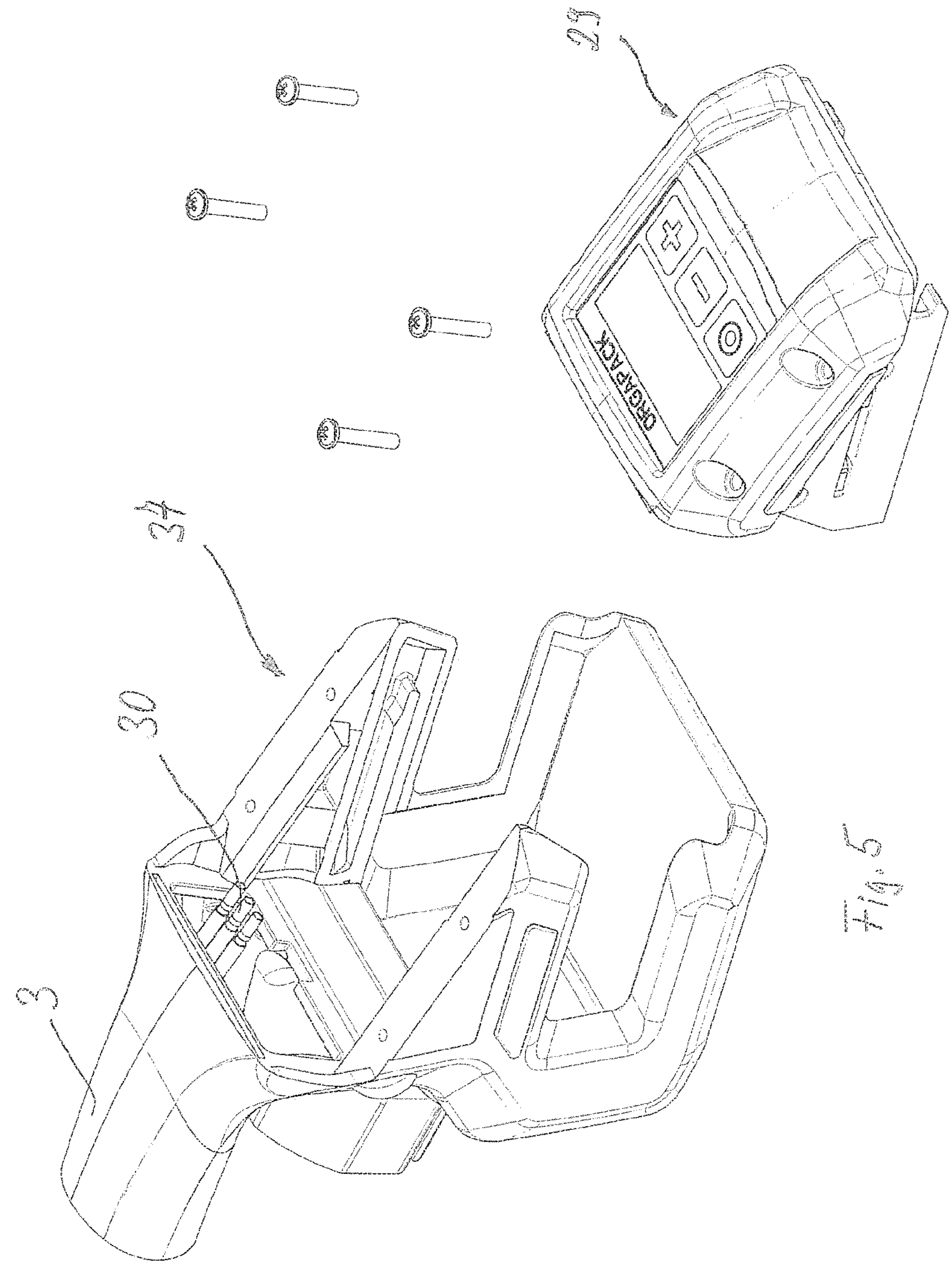
FIG. 5 is a perspective illustration of a rear housing region with a structural unit, provided for installation into the housing, of the operating and display device.
Figure 6:
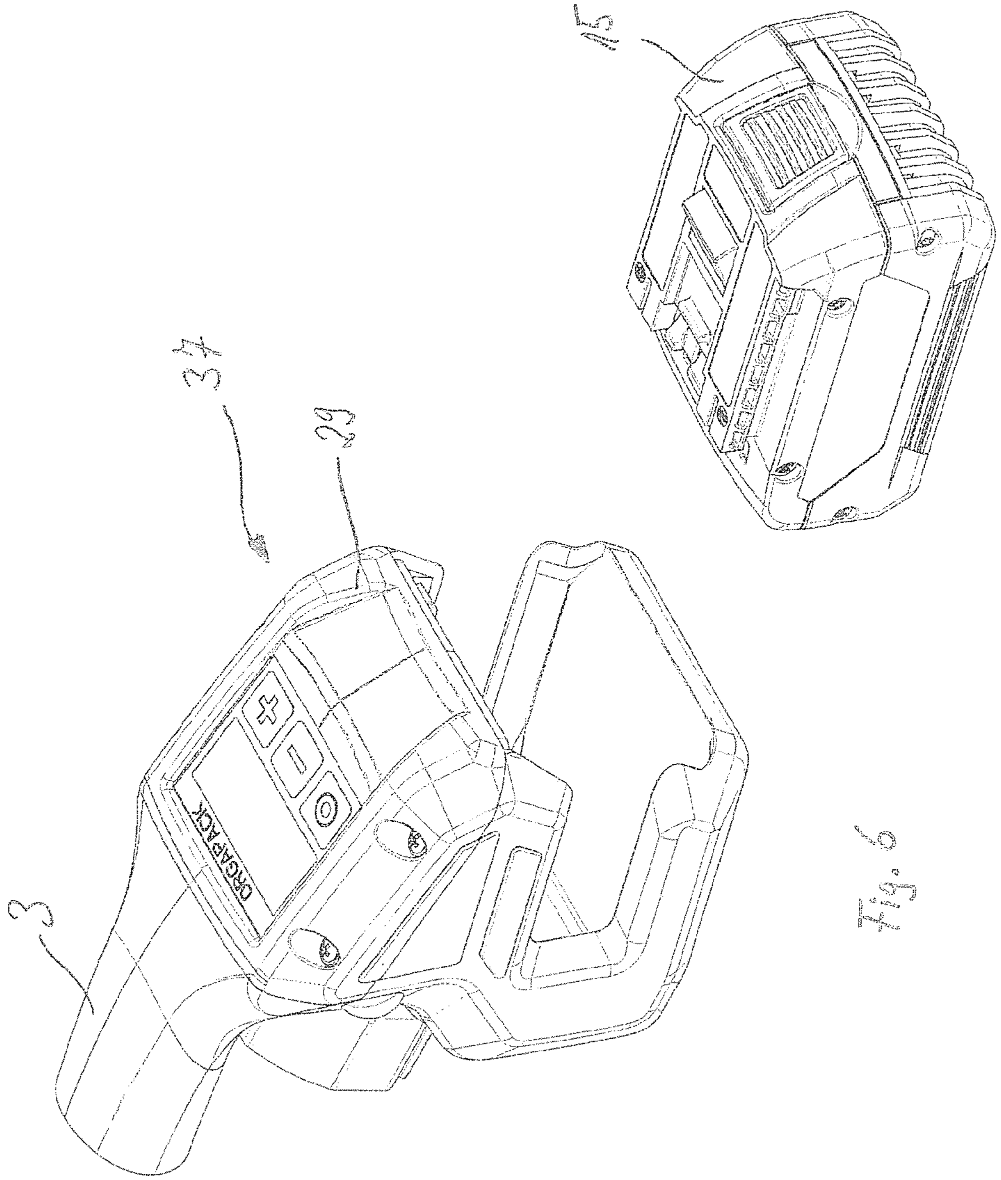
FIG. 6 is an illustration as per FIG. 5, with the structural unit inserted into the housing and with a battery provided for insertion into the housing.
Figure 4:
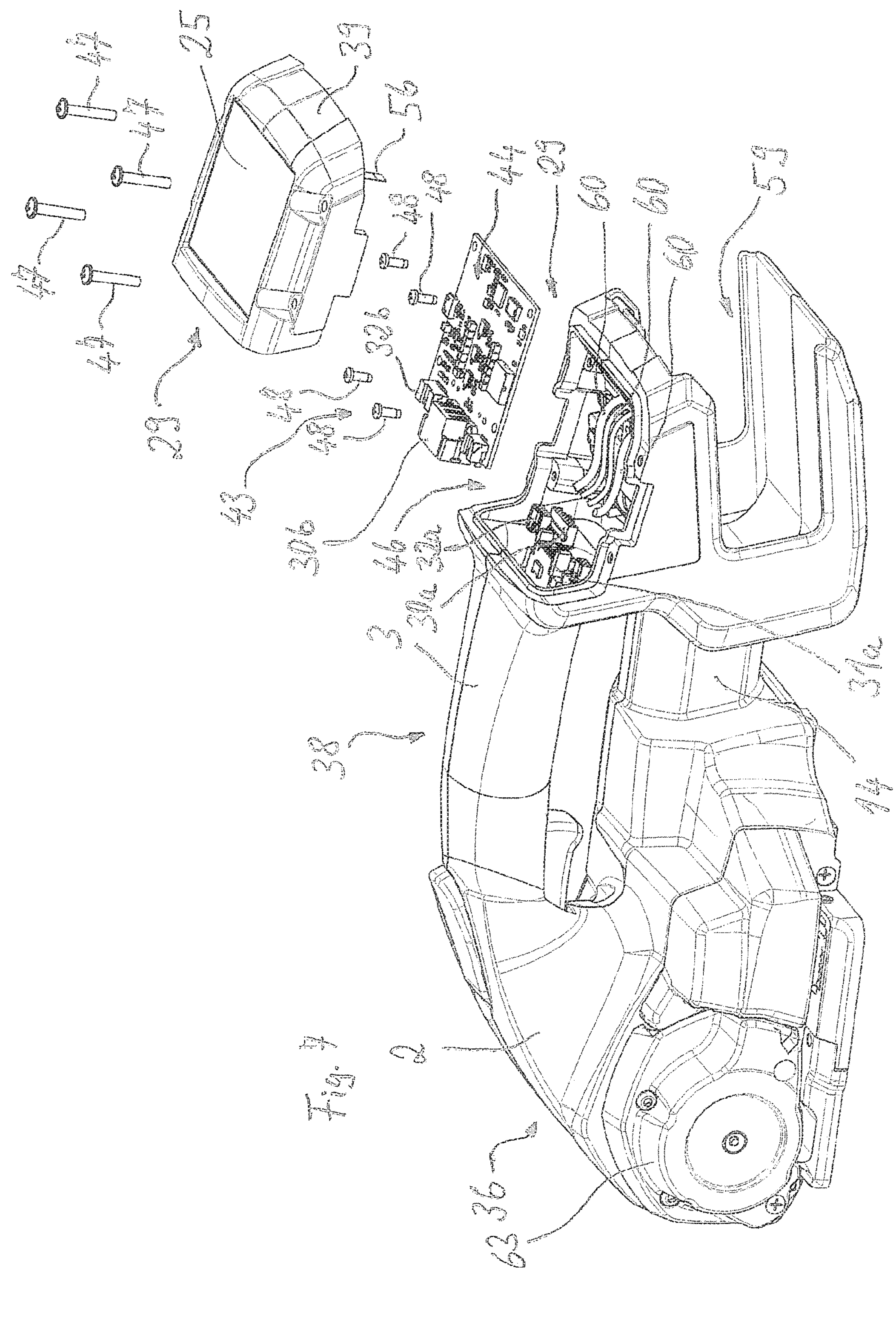
Figure 8:
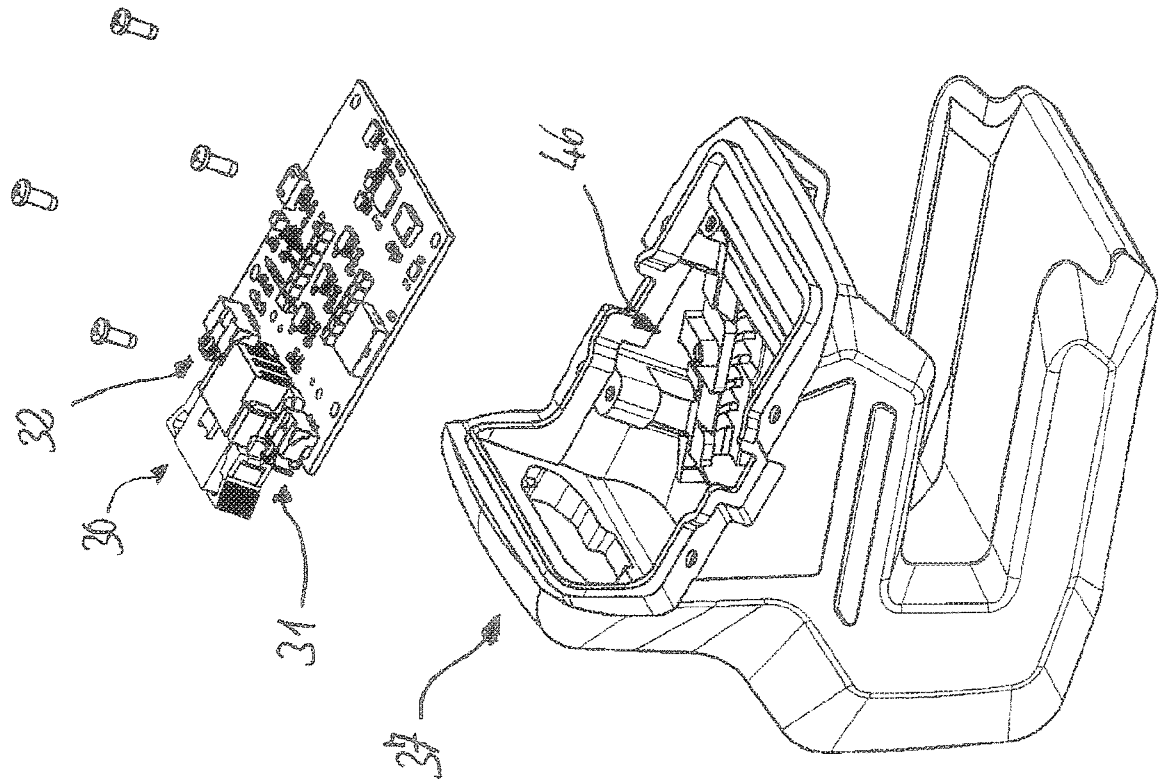
FIG. 8 is an illustration of the rear region of the second exemplary embodiment of the strapping apparatus, as shown in FIGS. 10 and 11.

Even though the illustrations of FIG. 4 depict a rectangular touchscreen in the case of which three operating elements 17 to 19 are formed in the region of the lower face side, the same illustration could also depict an LCD display with three operating elements 17 to 19 in the form of pushbuttons adjoining the lower face side of said LCD display outside the display area. It would self-evidently also be possible for said pushbuttons to be arranged at some other location, in particular at some other point adjacent to the display area. It is likewise possible, as in the case of a touchscreen, for operating elements 17 to 19 to be provided in a number other than that illustrated, and also with operating functions that differ from those here. In this case, the LCD display is smaller than the illustrated touchscreen by the sub-area 25*a*', in which the in this case positionally invariant pushbuttons are situated. Furthermore, it would be possible for a touchscreen to be provided which, aside from purely informative display elements, also displays all of the operating elements 17 to 19 on the surface, which serves both as a display and has a touch area, of the touchscreen and registers an actuation of said operating elements for the control of the strapping apparatus. The explanations given below are thus applicable both to the exemplary embodiment actually illustrated and to an exemplary embodiment with an LCD display surface or with some other display panel without operating function, which is then assigned separate operating elements.

On the display and operating panel 25*a*, it is possible for different items of information and touch-sensitive actuation or input elements to be displayed alternately or simultaneously. It is possible for different display and input levels to be provided, which can be selected and deselected and in which in each case different items of information and actuation and input elements can be displayed. The displayed elements may in particular provide information regarding the state and settings of the strapping appliance and of its components. As actuation elements, it is possible in particular for multiple pushbuttons 17 to 19, which can be triggered by touch, to be displayed. With said pushbuttons, it is possible to preselect and set the above-described different modes of manual (MAN), semi-automatic (SEM) and automatic (AUTO) of the strapping appliance, and parameters of the strapping processes. Settable and displayed parameters may for example be the tensioning force, the welding time and the cooling time. The setting may be performed by adding or subtracting predefined steps of the respective value by actuating the plus or minus pushbuttons 18, 19, and by confirming the value to be set by means of the mode switch 17, which in this case functions as a confirmation pushbutton. By actuation of the mode switch 17, the set value is stored in the controller in order to be utilized during the subsequent strapping process. Likewise, the band type used may be displayed and selected by selecting from a predefined list of band types 26. Furthermore, present operating states may be displayed, such as for example the state of discharge 27 of the battery and, during the tensioning process, by way of a progress bar 28, the tensioning force already attained as a fraction of the set tensioning force to be attained.

The values preset in this way are displayed by the strapping appliance on the display panel 32 and are utilized during strapping processes until the parameter values are changed again. The strapping processes themselves are triggered or started by way of the tensioning pushbutton 16, as a further actuation element, which is arranged in an ergonomically expedient manner in the region of the front end of the handle of the strapping appliance 1. To be able to place the band into the tensioning device, a rocker pushbutton 20 is arranged below the tensioning pushbutton 16, which rocker pushbutton may for example, and preferably, be in the form of a press button. By pressing the rocker pushbutton 20, the rocker 8 is opened, that is to say the rocker is pivoted with its tensioning plate 23 away from the tensioning wheel 7, such that a gap is formed between the tensioning plate 23 and the tensioning wheel 7. For as long as the rocker pushbutton 20 remains depressed, the tensioning plate 23 of the rocker is arranged with a spacing to the tensioning wheel 7, such that the band can be placed into the tensioning device between the tensioning plate 23 and the tensioning wheel 7. When the rocker pushbutton 20 is released, the rocker 8 pivots with the tensioning plate 23 in the direction of the tensioning wheel 7, whereby the tensioning plate 23 bears against the underside of the band, and the top side of the band bears against the tensioning wheel 7.

If the strapping appliance 1 is held by the handle 3, the tensioning pushbutton 16 can be actuated using the thumb of the hand that is holding the handle 3. The rocker pushbutton 20, which is arranged on the underside of the handle 3, can in this case be actuated in an ergonomically expedient manner by way of the index finger, without an adjustment of grip being necessary for this purpose. In other embodiments according to the invention, the rocker pushbutton 20 may also be arranged on the top side of the strapping appliance, in particular in the direct vicinity of the tensioning pushbutton 16, such that both the tensioning pushbutton 16 and the rocker pushbutton 20 can be actuated using the thumb of the hand that is gripping the handle 3. Here, the tensioning pushbutton 16 may be responsible for triggering both the tensioning process and the welding process, wherein, by setting the corresponding mode, it may be provided that a single press of the tensioning pushbutton triggers both the tensioning process and the subsequent connecting process. By selecting a different operating mode, it is also possible for only the tensioning process to be initiated by way of a single press of the tensioning pushbutton. To carry out the connecting or welding process, it is then necessary for the tensioning pushbutton to be pressed once again.

In an alternative embodiment to this, it is also possible for (only) one combination pushbutton to be provided on the strapping appliance, in particular in the region of the handle, which combination pushbutton has two actuation regions, one for the tensioning and welding, and one for the rocker actuation. In this case, too, it is optionally possible here for the tensioning and welding process to be triggered by way of only one actuation, or by way of mutually separate actuation processes, of one actuation region. The tensioning process may be triggered by way of a single actuation, and the connecting process may be triggered by way of a multiple actuation following the tensioning process, in particular by way of a double-click. The other actuation region is provided for the rocker actuation. Such a combination pushbutton may be situated for example at least approximately at that location on the strapping appliance at which the tensioning pushbutton 16 is arranged in FIGS. 1 and 2.

In a further alternative embodiment, it is possible, in particular in the region of the handle 3, for a dedicated pushbutton to be provided for each of the three functions. In this case, to trigger the respective process, it may be provided that only a single actuation of the respective pushbutton is required in each case.

In all embodiments, it is preferable if the pushbuttons assigned to the tensioning process and to the welding process trigger electrical switching processes which are supplied to the controller. By contrast, the actuation of the rocker pushbutton may preferably be electromechanically transmitted to the rocker and trigger a pivoting process of the rocker. It is likewise possible for one or more additional drive elements to be provided which trigger and perform the pivoting process of the rocker and which are electrically actuated.

All refinements of the described operating concepts may also be of independent significance and constitute independent inventions.

As illustrated in particular in FIGS. 5 to 11, the electronics, which may for example be in the form of an electronics board, for the control of the strapping appliance may be arranged below the display and operating device 43, in particular directly below the display and operating panel 25 and above the battery 15, said display and operating device being arranged behind the handle 3 as viewed in the longitudinal direction of extent of the strapping appliance and on the rear housing region 37. In the exemplary embodiment, power electronics for the electric motor are also accommodated on the electronics board, and the board can therefore also be referred to as control/power printed circuit board 44. As can be seen in the illustrations, it is thus the case in this exemplary embodiment according to the invention that said electronics board is situated between the receptacle for the battery 15 and the display and operating device 43. When the battery 15 is in the inserted state in its receptacle on the housing, such as is the case during the use of the strapping appliance, the control/power printed circuit board 44 is situated between the display and operating device 43 and the battery 15. Owing to the arrangement of the display and operating device 43 at a position close to the controller and close to the battery 15, less cabling is required in relation to previously known solutions. If cables are required or at least provided, it is furthermore the case that shorter cables are required for the cabling of the strapping appliance. Furthermore, the assembly process is made easier and quicker by way of this measure.

Likewise, it is now possible, according to the preferred refinement of the invention illustrated in FIGS. 5 to 11, for the display and operating device also be in the form of a modular assembly 29 or structural unit together with the controller and/or the electronics board provided for the same, which considerably simplifies the assembly process and any necessary repair work. In a preferred refinement of the invention, the single electronics board, or the single control/power printed circuit board 44, may also, if appropriate, comprise power electronics of the preferably only one electric motor. Said structural unit 29 may also be of multi-part form and inserted into a receptacle 46 provided for the purpose on the rear housing region 37 and detachably fastened to the housing by means of fewer screws, for example four screws 47. It is self-evidently also possible for releasable fastening elements other than screws 47 to be provided, for example clip elements. In the exemplary embodiment, the control/power printed circuit board 44 is by means of separate screws 48 It may likewise be provided that the board or the printed circuit board 44 is merely placed into the receptacle 46 and fixed in said position without further fastening means by way of the cover 39 and by way of the subassembly arranged on the cover 39.

Figure 9:
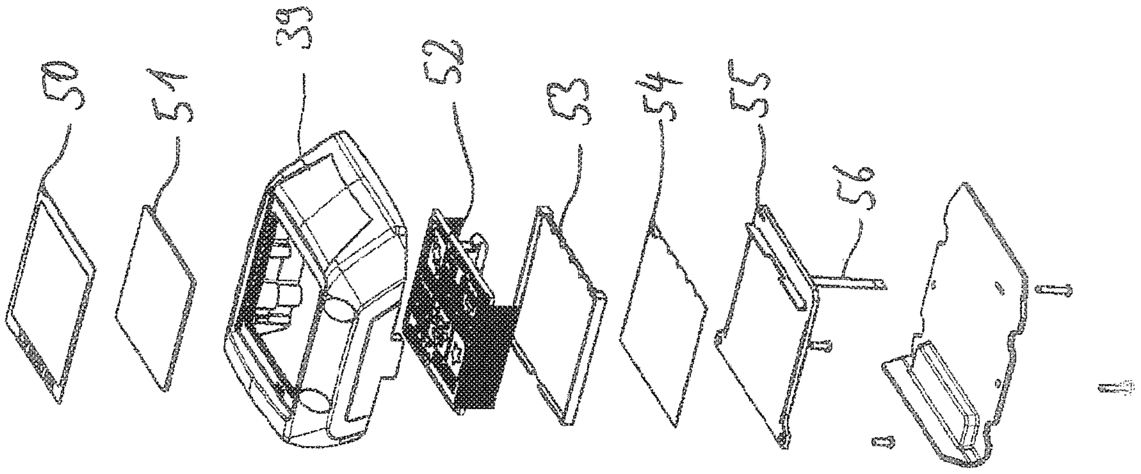
FIG. 9 is an exploded illustration of major parts of a possible display and operating device for the illustrated exemplary embodiments.

FIG. 9 shows, in an exploded illustration, that subassembly of the cover 39 which is a constituent part of the display and operating device 43. As can be seen here, said subassembly has a foil 50 of the display, which foil covers a touch glass 51. The touch glass 51 and the foil 50 are inserted from above into a recess of the frame-like cover 39. An LCD display 52—or a display based on a technology other than LCD—is inserted into the cover 39 from below. This is followed, in a downward direction, by a holder 53 and by a foil 54 and by a display printed circuit board 55. A cover is screwed onto the latter from below. The display printed circuit board 55 furthermore has, on its underside, a tab 56 which is oriented substantially vertically with respect to the underside and which is provided as a contact element for producing electrical contact to the control/power electronics printed circuit board 44. The tab 56 is inserted into the control/power electronics printed circuit board 44 (cf. also FIG. 7) and serves in particular for the transmission of signals between the display and operating device 43 and the control/power electronics printed circuit board 44.

An electrical contact for the supply of electricity and for data transfer between the strapping appliance and the assembly 29 may be provided by way of one or more electrical plug connections 30, 31, 32. In the exemplary embodiment, for this purpose, four detachable plug connections 30, 31, 32 are provided; in other embodiments of the invention, a number of electrical plug connections that differs from this may also be provided. For this purpose, the housing preferably has, in the region of the board, plug connectors 30*b*, 31*b*, 32*b* which are detachably connectable to corresponding plug connector counterparts 30*a*, 31*a*, 32*a* of the board of the control/power printed circuit board 44. The board or the structural unit 29 can be pushed by way of its plug connectors 30*b*, 31*b*, 32*b* onto the plug connector counterparts 30*a*, 31*a*, 32*a* that are fastened to the housing. Here, one of the plug connections 30 serves for the supply of electricity to the motor, and the second plug connection 32 serves for the transmission of signals generated by sensors of the motor, in particular by Hall sensors. The third plug connection 31 is provided for the transmission of signals from sensors which are situated in the region of the mechanism of the strapping appliance, in particular in the region of the tensioning device and/or of the connecting device and of their respective drive trains. A fourth plug connection may serve for the transmission of signals of pushbuttons which trigger particular functions, in particular the tensioning pushbutton 16 and the rocker pushbutton 20. In other preferred embodiments, signals from different components of the strapping apparatus may also be transmitted via one or more plug connections.

Provided on the housing directly below the structural unit 29 is a receptacle 59 for the battery 15, into which receptacle the battery 15 can be pushed from the rear of the housing and arranged securely by means of a releasable snap-action connection. Within the recess 59 there are provided further electrical contacts of the strapping appliance for the connection of the battery, for example a contact plate.

From the contact plate, which is not visible in detail in the illustration of FIGS. 5 to 11, multiple cables 60 extend to the underside of the control/power printed circuit board. In this way, the electronics of the control/power electronics printed circuit board 44 are supplied with electrical current from the battery 15, and electrical current for the motor 14, for preparation by way of the power electronics, is provided, said electrical current passing via the plug connection 30 to the motor 14. The cables 60 may form a loop and may be fixed in their position by means of a clamping piece 61 which is fixedly screwed onto the underside of the receptacle.

The housing 2 of the strapping appliances 1 illustrated in the figures have the front region and the rear region, between which there is situated a central housing region 38 with a handle 3. In the two preferred exemplary embodiments according to the invention illustrated here, the front region and the rear region 36, 37 of the housing 2 are connected to one another by way of the handle 3. In these exemplary embodiments and in other exemplary embodiments, the housing may have two interconnected shells, and may preferably be composed of plastics shells of said type. The parting line or the parting plane at which the two shell halves are joined to one another and are connected to one another by suitable fastening means, such as for example screws, may preferably extend over the entire length of the strapping appliance, and may also run through the handle 3 over the entire length thereof.

The front region 36 of the housing 2 surrounds the tensioning, friction welding and severing device in such a way that the housing 2 exposes, or does not cover, only those mechanical components of the strapping appliance which a user should have access to, in particular parts which are provided for engaging into the two band layers during the strapping process. On one side of the front region 36 of the housing 2 there is provided an opening which can be detachably closed by way of a cover 63 and which can be utilized for maintenance purposes, for example for the exchange of wear parts.

Figure 10:
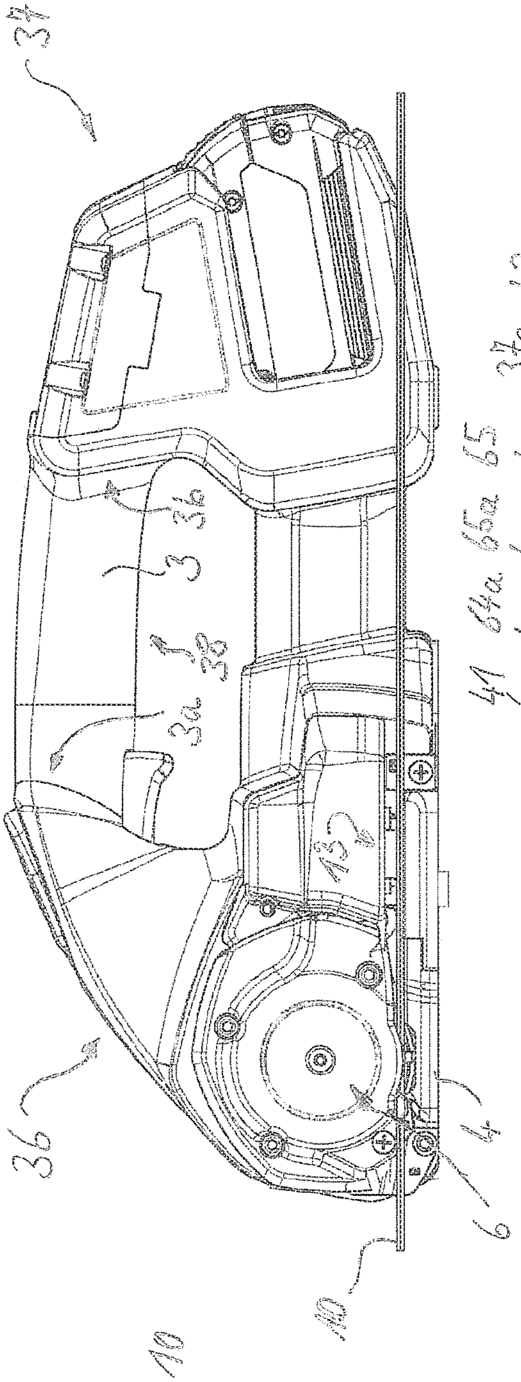
FIG. 10 shows a side view of one embodiment of the mobile strapping apparatus.

At least in the exemplary embodiments of FIGS. 1 and 10, the rear region 37 of the housing 2 is, from a highly schematized perspective, of cuboidal form. The handle 3, by way of its rear end, adjoins or merges into the top side 37*a* of the rear region 37 of the housing 2. "Top side" 37*a* is to be understood to mean the side which is visible in a plan view when the strapping appliance is arranged with its base plate 4 on a horizontal plane. The opening or receptacle 59 in the housing is provided on a rear side of the rear housing region, the cross section of which opening or receptacle at least approximately corresponds to the cross section of a battery 15.

The handle 3, which is arranged substantially in the region of the top side of the strapping appliance, merges by way of its front end 3*a* into the front region of the housing, in particular into the top side of the front housing region 36. As seen in the opposite viewing direction, it is thus the case that the front housing region 36 merges into the handle 3. The rear end 3*b* of the handle 3 merges into the rear region 37 of the housing 2, in particular into the top side 37*a* of the rear housing region 37. In the preferred exemplary embodiment, in each case one half of the handle 3 belongs to one housing shell, and the other half of the handle belongs to the other housing shell. The respective half of the handle is connected in unipartite fashion to, or is integrated into, the respective housing shell.

The strapping appliance 1 has, in particular in the region of the tensioning device 6 and of the fastening or friction welding device 13, band-guiding means such as are known per se, by which band guiding means an at least substantially predetermined profile of the strapping band 10 in the strapping appliance, in particular of the band section between the tensioning device and the welding device 13, is realized. Said profile, in particular a centerline 10*a*, which at least in the plan view is in the form of a straight line, of a top side of the band 10 will hereinafter be provided as a reference line and definition aid for the orientation of the handle 3. In said plan view, said band orientation runs along a straight line.

If the transition regions of the handle 3 into the front housing region 36 and into the rear housing region 37 are connected to one another by a straight line 40, said straight line 40 runs non-parallel with respect to the centerline 10*a* of the band profile in the strapping appliance 1. Transition regions can be regarded as being the points at which, in each case, the profile of the surfaces of the top sides of the front and rear housing regions 36, 37 changes in order to transition here into the handle in each case. Alternatively, (front and rear) transition regions may also be understood as meaning the ends of the handle up to which it is possible for the handle to be entirely or at least partially gripped using the operating hand. Said transitions may be of continuous or discontinuous form. The two points 41, 42 of the transition regions that are utilized for forming the imaginary straight line 40 may, with respect to a plan view, be situated in the center of the respective width of the handle 3. With respect to the straight line 10*a* arising from the band profile, the two points 41, 42 have different spacings 62, 62 to the straight line 10*a*, and are thus offset with respect to one another in the direction of the band profile. With respect to a plan view of the strapping appliance, and with respect to the band profile in the strapping appliance that arises from the arrangement of the band, the straight lines 10*a*, 40 run non-parallel with respect to one another, and enclose a non-0° angle φ.

The angle φ is furthermore distinguished by the fact that the straight line 40 that defines it runs, with respect to the plan view and with respect to the band 10 and its centerline 10*a*, on the other side 31 of the centerline 10*a* in relation to the insertion side 32 from which the band is inserted into the strapping appliance. The handle 3 is thus, with respect to the band 10, situated on the other side 31 in relation to the insertion side 32. In the preferred embodiment of the invention in the illustration of FIGS. 2 and 11, the spacing of the straight line 40 to the centerline of the band increases in the profile of the handle 3 from the front housing region 36 to the rear housing region 37.

In preferred embodiments of the invention, said angle φ may be selected in particular from a range of 3° to 89°, particularly preferably from a range of 5° to 70°, and more preferably from a range of 7° to 35°. It is the intention here for each individual angle value from the above-stated angle ranges to be explicitly disclosed. An explicit listing of each individual angle value is omitted merely owing to a lack of practicability. As can be seen in particular in the lower plan-view illustration of FIG. 1, the obliquely running handle gives rise to an offset of the rear housing region 37 away from the strapping band 10, such that the rear housing region 37 does not pose an obstruction during the placement of the strapping band into the strapping appliance. In this way, the preparation time for the execution of a strapping operation is shortened, and the functional reliability of strapping appliances is improved.

Figure 11:
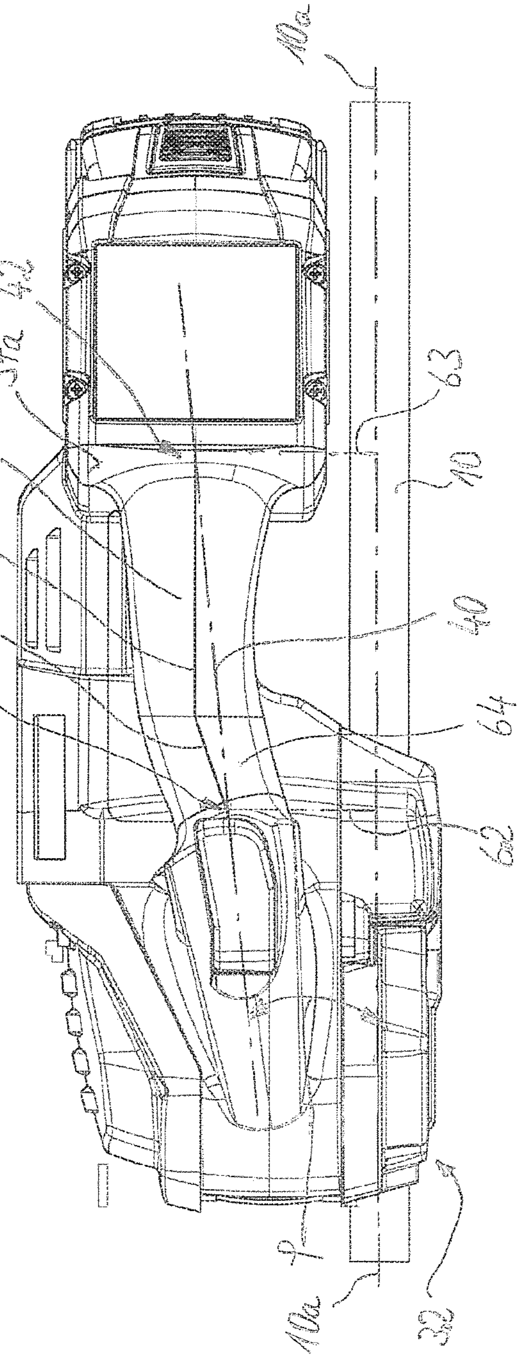
FIG. 11 shows a plan view of the strapping apparatus from FIG. 10 with a strapping band placed therein.

FIGS. 10 and 11 show the second exemplary embodiment for a strapping appliance according to the invention and its housing, which differs from the exemplary embodiment according to the invention discussed above in particular with regard to the configuration of the handle. By contrast to the exemplary embodiment in FIG. 1, the handle 3 in this case is not curved but has two substantially rectilinear sections 64, 65 of the handle 3, said sections adjoining one another at an obtuse angle. The front section of the two sections 64 comprises the front point 41 of the transition of the handle to the front region 36 of the housing, whereas the rear section 65 of the handle, said rear section being arranged behind said front section as viewed in the longitudinal profile direction of the handle, comprises the rear point 42 of the transition of the handle 3 into the rear region 37 of the housing.

The two substantially rectilinearly oriented sections of the handle enclose an angle of approximately 160° in the exemplary embodiment. Here, the orientation of the two sections 64, 65 is such that its centerline 64*a*, which corresponds to the longitudinal profile of the front section of the handle, encloses, with the centerline 10*a* of the band, the angle φ by which the handle is, with respect to a plan view, at least regionally inclined with respect to the band. The longitudinal profile of the rear section 65 itself, that is to say in particular the centerline 65*a* thereof, is by contrast oriented substantially parallel to the band section, situated opposite the handle, of the strapping band. This configuration of the handle 3 gives rise to an ergonomically expedient enlarged spacing between the strapping band and the operating hand that is holding the strapping appliance.

List of reference designations

| | |
|---|---|
| 1 | Strapping appliance |
| 2 | Housing |
| 3 | Handle |
| 3a | Front end |
| 3b | Rear end |
| 4 | Base plate |
| 5 | Base surface |
| 6 | Tensioning device |
| 7 | Tensioning wheel |
| 8 | Rocker |
| 8a | Rocker pivot axis |
| 9 | Rocker pushbutton |
| 10 | Band |
| 10a | Centerline |
| 11 | Welding shoe |
| 12 | Severing device |
| 13 | Friction welding device |
| 14 | Motor |
| 15 | Battery |
| 16 | Actuation element |
| 17 | Mode switch |
| 22 | Counter holder surface |
| 23 | Tensioning counter support |
| 25 | Operating and display panel |
| 29 | Assembly |
| 30 | Plug connection |
| 30a | Plug connector counterpart |
| 30b | Plug connector |
| 31 | Plug connection |
| 31a | Plug connector counterpart |
| 31b | Plug connector |
| 32 | Plug connection |
| 32a | Plug connector counterpart |
| 32b | Plug connector |
| 36 | Front region |

-continued

List of reference designations

| | |
|---|---|
| 37 | Rear region |
| 37a | Top side |
| 38 | Central region |
| 39 | Cover |
| 40 | Straight line |
| 41 | Point |
| 42 | Point |
| 43 | Display and operating device |
| 44 | Control/power electronics printed circuit board |
| 45 | |
| 46 | Receptacle |
| 47 | Screw |
| 48 | Screw |
| 50 | Foil |
| 51 | Touch glass |
| 52 | LCD display |
| 53 | Holder |
| 54 | Foil |
| 55 | Display printed circuit board |
| 56 | Tab |
| 59 | Receptacle |
| 60 | Cable |
| 61 | Clamping piece |
| 62 | Spacing |
| 63 | Spacing |
| 64 | Front section |
| 65 | Rear section |

The invention claimed is:

1. A mobile strapping apparatus comprising:
- a tensioning device configured to apply a band tension to a loop of a strapping band;
- a fastening device configured to fasten to one another two regions of the loop of the strapping band situated one atop the other;
- an energy supply configured to provide drive energy for motor-imparted drive movements of the strapping apparatus;
- a housing having: (1) a front housing region covering at least part of the tensioning device; (2) a rear housing region formed to accommodate the energy supply; and (3) a handle extending between the front and the rear housing regions; and
- a modular assembly comprising:
  - a display screen:
  - an actuatable input device;
  - a display printed-circuit board communicatively connected to the input device and the display screen;
  - a control printed-circuit board communicatively connected to the display printed-circuit board and operatively connected to the tensioning device and the fastening device; and
  - a support supporting the display screen, the input device, the display printed-circuit board, and the control printed-circuit board, wherein the support is removably mountable to the housing to removably mount the modular assembly to the housing.

2. The mobile strapping apparatus of claim 1, wherein the control printed-circuit board is sandwiched between the modular assembly and the energy supply when the modular assembly is mounted to the housing.

3. The mobile strapping apparatus of claim 1, wherein the modular assembly is positioned in a receptacle in the rear housing region of the housing.

4. The mobile strapping apparatus of claim 1, wherein the control printed circuit board is communicatively connected to the display printed-circuit board through a wire.

5. The mobile strapping apparatus of claim 1, wherein the display screen is positioned on a top side of the housing.

6. The mobile strapping apparatus of claim 1, wherein with respect to a plan view of the mobile strapping apparatus, a longitudinal axis of the handle forms an acute angle with respect to a longitudinal direction of the strapping band when the strapping band extends between the tensioning device and the fastening device.

7. The mobile strapping apparatus of claim 1, wherein the support comprises a cover.

8. A mobile strapping apparatus comprising:

a tensioning device configured to tension a loop of a strapping band;

a fastening device configured to fasten to one another two regions of the loop of the strapping band;

a motor operably connectable to the tensioning device and the fastening device to drive the tensioning device and the fastening device;

a housing comprising a front region, a rear region, and a handle extending between the front and rear regions, the rear region of the housing defining a receptacle;

a power source removably mounted to the rear region of the housing and electrically connected to the motor to power the motor;

a modular display assembly removably mounted to the housing, the modular display assembly comprising:

an actuatable input device;

a display screen; and a display printed-circuit board communicatively connected to the input device and the display screen; and a control printed-circuit board mounted to the housing within the receptacle, the control printed-circuit board comprising a strapping-apparatus controller communicatively connected to the display printed-circuit board to receive signals from the input device, operably connected to the motor to control the motor, and operably connected to the display printed-circuit board to control the display screen to display images, wherein when mounted to the housing the modular display assembly covers the receptacle and encloses the control printed-circuit board so the control printed-circuit board is sandwiched between the power source and the modular display assembly, wherein the modular display assembly is removable from the housing independent of the control printed-circuit board to expose the control printed-circuit board.

9. The mobile strapping apparatus of claim 8, wherein the input device comprises a touch panel and the display screen and the touch panel form a touch screen.

10. The mobile strapping apparatus of claim 8, wherein with respect to a plan view of the mobile strapping apparatus, a longitudinal axis of the handle forms an acute angle with respect to a longitudinal direction of the strapping band when the strapping band extends between the tensioning device and the fastening device.

* * * * *